United States Patent
Presley

(10) Patent No.: US 11,254,478 B2
(45) Date of Patent: Feb. 22, 2022

(54) SANITARY COVER

(71) Applicant: Denise Presley, Casselberry, FL (US)

(72) Inventor: Denise Presley, Casselberry, FL (US)

( * ) Notice: Subject to any disclaimer, the term of this patent is extended or adjusted under 35 U.S.C. 154(b) by 0 days.

(21) Appl. No.: 17/074,029

(22) Filed: Oct. 19, 2020

(65) Prior Publication Data

US 2021/0122541 A1 Apr. 29, 2021

Related U.S. Application Data

(60) Provisional application No. 62/924,798, filed on Oct. 23, 2019.

(51) Int. Cl.
*B65D 51/18* (2006.01)
*A01N 25/34* (2006.01)

(52) U.S. Cl.
CPC ............. *B65D 51/18* (2013.01); *A01N 25/34* (2013.01); *B65D 2251/009* (2013.01); *B65D 2251/0028* (2013.01)

(58) Field of Classification Search
CPC ............ B65D 51/18; B65D 2251/0028; B65D 2251/009; B65D 2519/0086; A01N 25/34; A01N 59/16; F21V 33/0052
USPC ......... 220/260; 442/123, 618, 443; 150/165; 224/217; 160/66
See application file for complete search history.

(56) References Cited

U.S. PATENT DOCUMENTS

| | | | | |
|---|---|---|---|---|
| 4,836,256 A | * | 6/1989 | Meliconi | H01H 9/0242 206/523 |
| 5,092,459 A | * | 3/1992 | Uljanic | H01H 9/0242 200/302.2 |
| 5,316,141 A | * | 5/1994 | Jalomo | B65D 5/20 150/128 |
| 5,499,713 A | * | 3/1996 | Huffer | H01H 9/0242 206/320 |
| 5,648,757 A | * | 7/1997 | Vernace | G08B 21/24 206/305 |
| 5,873,456 A | * | 2/1999 | Hull | H01H 9/0242 206/38.1 |
| 10,782,013 B1 | * | 9/2020 | Cowen | F21V 33/0084 |
| 2003/0127345 A1 | * | 7/2003 | Zuleta | H01H 9/0242 206/320 |
| 2006/0124482 A1 | * | 6/2006 | Hodges | H01H 9/0242 206/320 |
| 2007/0141126 A1 | * | 6/2007 | Hudson | A41D 31/305 424/443 |
| 2008/0190528 A1 | * | 8/2008 | Steinberg | H01H 9/0242 150/165 |
| 2009/0038721 A1 | * | 2/2009 | Wakitani | A63F 13/24 150/154 |

(Continued)

*Primary Examiner* — J. Gregory Pickett
*Assistant Examiner* — Tia Cox
(74) *Attorney, Agent, or Firm* — Boudwin Intellectual Property; Daniel Boudwin

(57) ABSTRACT

A sanitary cover for various items is provided. The device includes a flexible member having a base opposite an end, an upper wall, a lower wall, and a pair of sidewalls defining an interior volume. In some embodiments, the end is open, wherein alternate embodiments an opening is defined through the lower wall. A closure is disposed along the opening, wherein the closure seals the interior volume when the closure is removably secured together. A germicidal coating is disposed on an exterior surface of the flexible member.

18 Claims, 4 Drawing Sheets

(56) References Cited

U.S. PATENT DOCUMENTS

| | | | |
|---|---|---|---|
| 2010/0062075 A1* | 3/2010 | Schinder | A01N 59/16 |
| | | | 424/618 |
| 2010/0102084 A1* | 4/2010 | Clark | H01H 9/0242 |
| | | | 222/80 |
| 2011/0025933 A1* | 2/2011 | Schindler | C09D 5/14 |
| | | | 348/843 |
| 2014/0353201 A1* | 12/2014 | Molineux | A45C 11/00 |
| | | | 206/524.3 |
| 2016/0067134 A1* | 3/2016 | Moon | A61G 13/02 |
| | | | 5/600 |

* cited by examiner

SANITARY COVER

CROSS REFERENCE TO RELATED APPLICATIONS

This application claims the benefit of U.S. Provisional Application No. 62/924,798 filed on Oct. 23, 2019. The above identified patent application is herein incorporated by reference in its entirety to provide continuity of disclosure.

BACKGROUND OF THE INVENTION

The present invention relates to sanitary covers. More particularly, the present invention pertains to a sanitary cover having an integrated germicidal coating along an exterior thereof to reduce the spread of germs and disease.

Many individuals are concerned with hygiene and cleanliness, particularly regarding devices or items frequently encountered by others in communal areas or shared living spaces, such as hotel rooms, hospital rooms, or the like. Due to the regular contact with other individuals, objects within such areas are often exposed to germs, bacteria, viruses, or other potentially harmful contaminants that can be easily transferred via contact. This can be exacerbated during flu season or other events, such as a pandemic. While sanitizing such locations is common, these harmful contaminants may remain when the sanitizing process is performed poorly or not otherwise properly completed. Should an individual contact such a contaminant, the individual risks contracting a harmful or dangerous illness. Therefore, a device that can protect frequently contacted items in communal locations, while also including a germicidal coating to eliminate any germs or contaminants that are transferred to the item is desired.

In light of the devices disclosed in the known art, it is submitted that the present invention substantially diverges in design elements from the known art and consequently it is clear that there is a need in the art for an improvement to existing sanitary covers. In this regard, the instant invention substantially fulfills these needs.

SUMMARY OF THE INVENTION

In view of the foregoing disadvantages inherent in the known types of sanitary covers now present in the known art, the present invention provides a sanitary cover wherein the same can be utilized for providing convenience for the user when eliminating germs, viruses, or other contaminants from an exterior surface of the cover.

The present system comprises a flexible member having a base, an end opposite the base, an upper wall, a lower wall, and a pair of side walls defining an interior volume. In some embodiments, the end opposite the base comprises an open end, whereas in alternate embodiments, the end is a closed end. In such embodiments, an opening is defined through the lower wall. A closure is disposed along the opening. In some embodiments, the closure is disposed on the upper and lower walls at the open end. The closure is configured to seal the interior volume when removably secured together. A germicidal coating is disposed on an exterior surface of the flexible member.

In some embodiments, the exterior surface of the flexible member comprises a textured surface. In another embodiment, the textured surface comprises a plurality of grooves extending along the exterior surface. In other embodiments, the germicidal coating comprises an anti-bacterial gel. In yet another embodiment, the closure comprises a zipper closure.

In some embodiments, the closure comprises an adhesive closure. In other embodiments, the upper wall comprises a greater length than that of the lower wall. In another embodiment, the lower wall extends orthogonally from the base and the upper wall extends from the base at an obtuse angle such that the open end comprises a greater area than the base. In yet another embodiment, the base comprises an arcuate shape.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
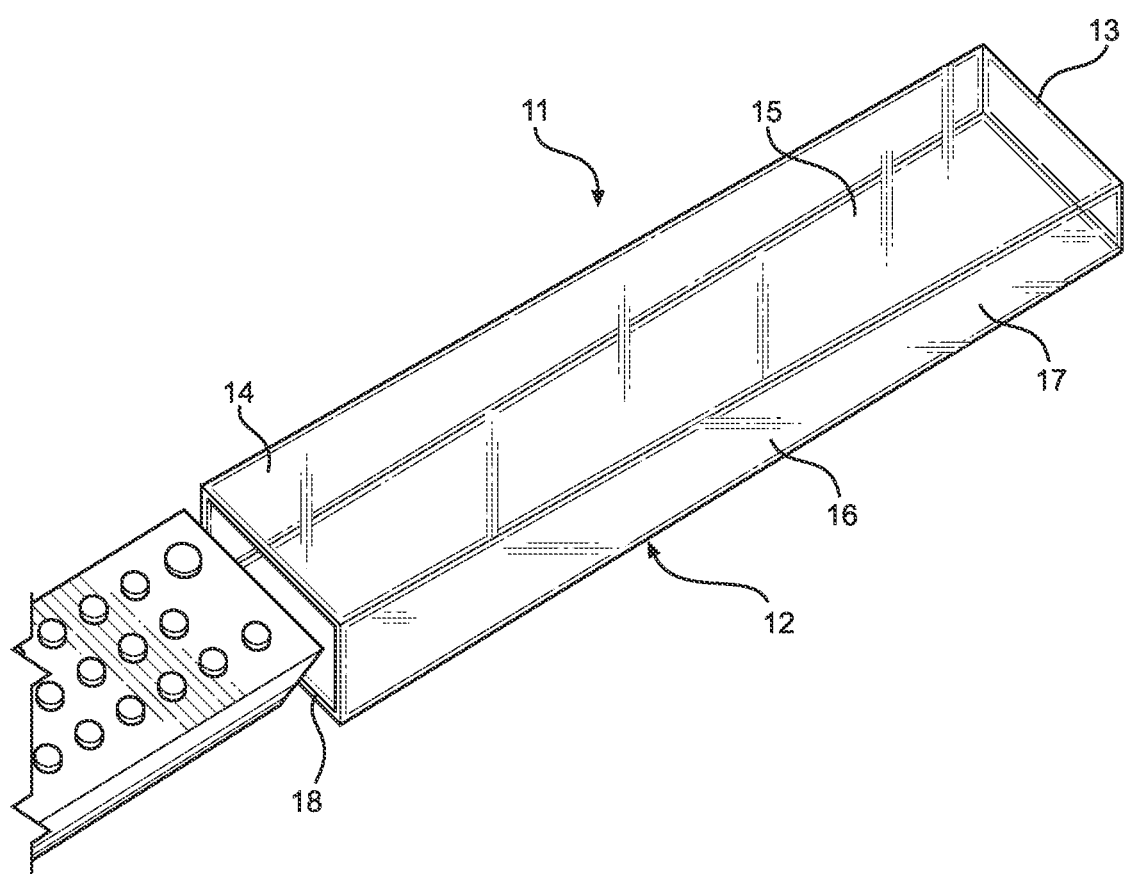
FIG. 1A shows a perspective view of an embodiment of the sanitary cover.

Reference is made herein to the attached drawings. Like reference numerals are used throughout the drawings to depict like or similar elements of the sanitary cover. The figures are intended for representative purposes only and should not be considered to be limiting in any respect.

Figure 1B:
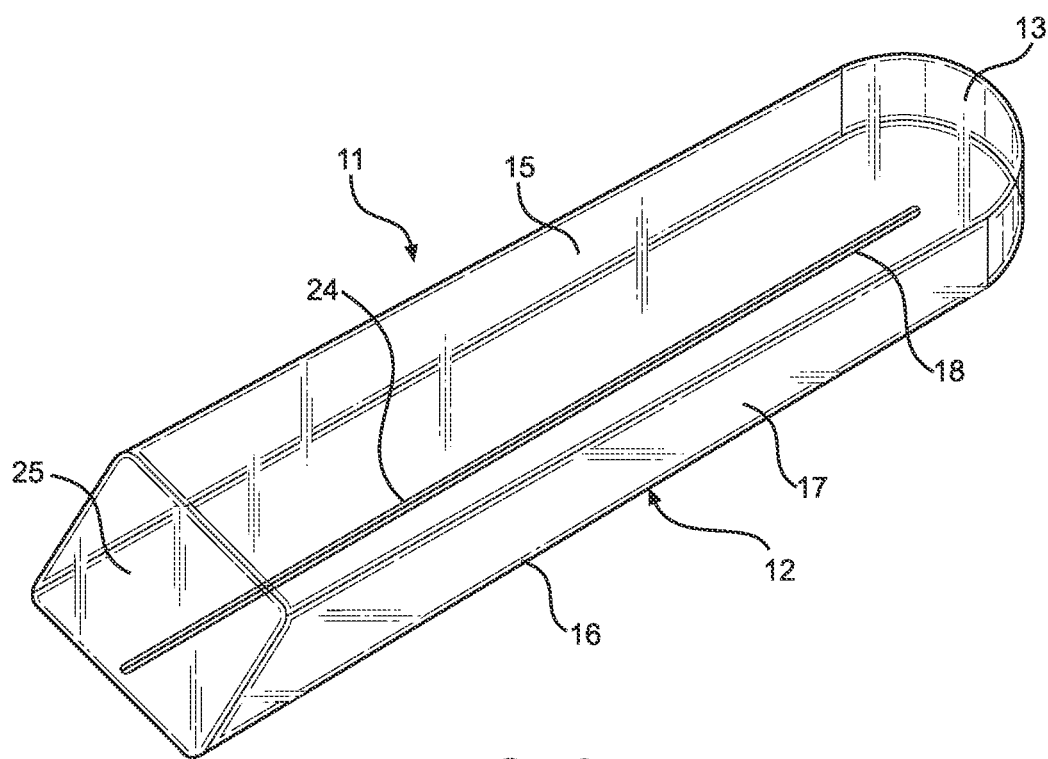
FIG. 1B shows a perspective view of an alternate embodiment of the sanitary cover.

Referring now to FIGS. 1A and 1B, there is shown a perspective view of an embodiment of the sanitary cover and a perspective view of an alternate embodiment of the sanitary cover, respectively. In the illustrated embodiment of FIG. 1A, the sanitary cover 11 comprises a flexible member 12 having a base 13 and an open end 14 opposite the base 13. An upper wall 15, a lower wall 16, and a pair of sidewalls 17 extend from the base 13, thereby defining an interior volume. The interior volume is dimensioned to receive a commonly used object, such as a remote control therein, wherein the sanitary cover 11 ensures that a user need not touch the commonly used object directly. In the shown embodiment, the flexible member 12 comprises a transparent material, such that the user can easily view the object stored within the interior volume. In this manner, the user can interact with controls disposed on the object while the object is placed within the interior volume. The dimensions of the sanitary cover 11 are contemplated to comprise a variety of sizes and shapes to conform to a desired object, however certain structural features provide additional benefits for conforming to particular objects and will be further described elsewhere herein.

In the shown embodiment of the FIG. 1B, the sanitary cover 11 comprises a closed end 25 disposed opposite the base 13, wherein an opening 24 is defined along a length of the lower wall 16. The opening 24 provides access to the interior volume, allowing an object to enter the sanitary cover 11. This arrangement provides a benefit when the object is affixed to a surface or another object, such that the object cannot be removed and inserted through the open end 14 of the embodiment of FIG. 1A, such as a door handle or toilet handle. In the illustrated embodiment of the FIG. 1B, the base 13 comprises an arcuate shape, such that the base 13 can conform to the shape of a desired object. In this manner, the sanitary cover 11 is retained in close contact with the object, such that the object can be readily utilized within the sanitary cover 11 without the flexible member 12 being displaced from the object.

In the illustrated embodiment of FIG. 1A, the open end 14 further comprises a closure 18 disposed thereon, wherein the closure 18 is configured to selectively secure the open end 14 in a closed position, thereby retaining a desired object within the interior volume. In the shown embodiment, the closure 18 comprises a zipper seal device, however, in alternate embodiments, the closure 18 can comprise an adhesive. In cases with an adhesive closure 18, the adhesive can be further covered by a removable backing, thereby preserving the adhesive until the closure 18 is desired to be used. In the shown embodiment of FIG. 1A, the closure 18 extends along a width of each of the upper wall 15 and the lower all 16, however, in other embodiments, the closure 18 further extends along the pair of sidewalls 17. In such an embodiment, the interior volume is entirely sealed by the closure 18. Similarly, in the embodiment of the FIG. 1B, the closure 18 extends along opposing sides of the opening 24 such that the opening 24 can be sealed about the object. When in use with an affixed object, such as a door handle, the closure 18 can be partially sealed about the stem of the handle to encase the handle within the sanitary cover 11. In the shown embodiment, the opening 24 extends along an entirety of the lower wall 16 between the base 13 and the closed end 25.

Figure 2:
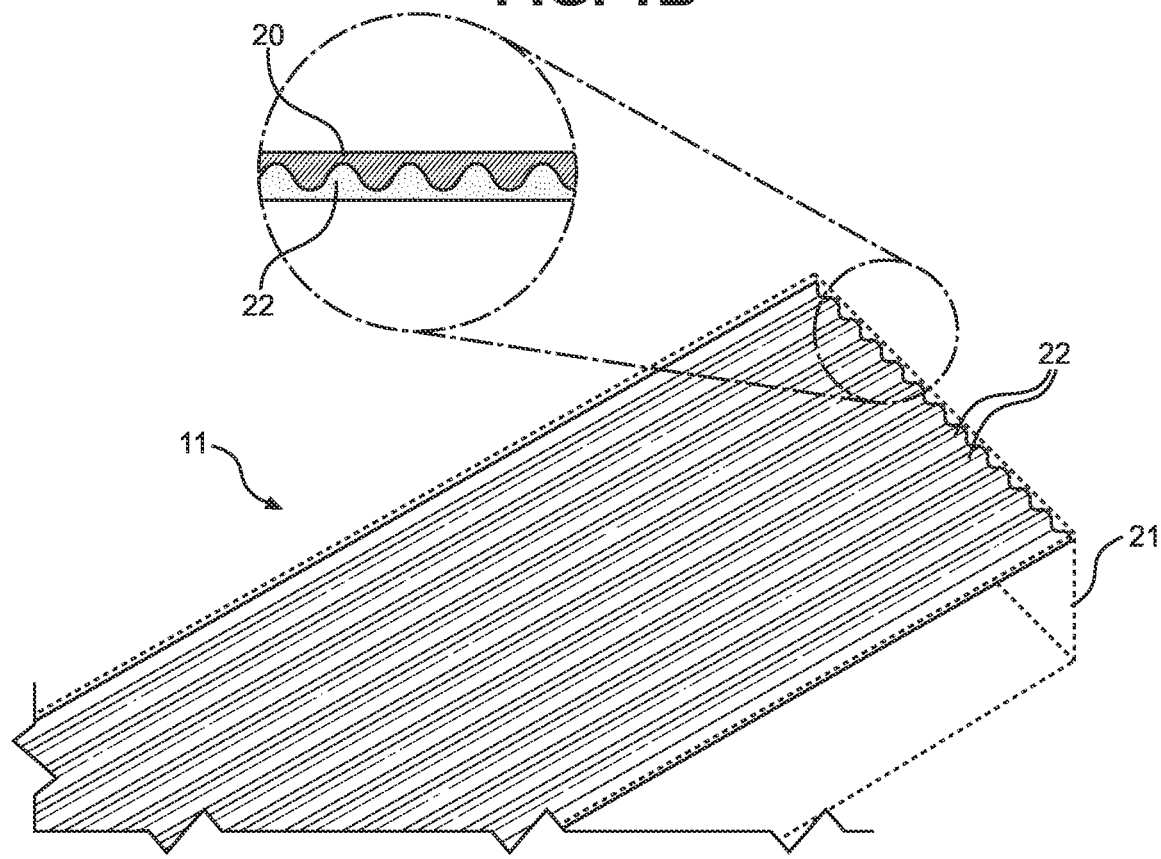
FIG. 2 shows a close-up view of the external surface of an embodiment of the sanitary cover.

Referring now to FIG. 2, there is shown a close-up view of the external surface of an embodiment of the sanitary cover. The sanitary cover 11 further comprises a germicidal coating 20 on an exterior surface 21 thereof. In some embodiments, the germicidal coating 20 comprises an antibacterial gel coating that continually disinfects the exterior surface 21 of the sanitary cover 11, such that any germs, bacteria, viruses, or other harmful contaminants on a user's hands or a surface are destroyed or rendered inert. In this manner, the sanitary cover 11 ensures that the commonly used public objects are maintained in a sanitary and disinfected state, such that risk of a user transferring a dangerous contaminant to another surface or themselves is minimized. The germicidal coating 20 is contemplated to remain viable for an extended period, such that the sanitary cover 11 can be used continually over the course of a day or more. In some embodiments, the sanitary cover 11 is contemplated to be replaced daily, such as during typical housekeeping services in hotels or other public places.

In the shown embodiment, the exterior surface 21 comprises a textured surface, such that the germicidal coating 20 is retained thereon. The textured surface provides the user with greater frictional engagement and grip, such that the germicidal coating 20 does not result in the user dropping or otherwise mishandling the object within the sanitary cover 11. In some embodiments, the textured surface comprises a rough exterior, similar to a sandpaper grit. In the shown embodiment, the textured surface comprises a plurality of grooves 22 extending longitudinally across the sanitary cover 11 between the base and the open or closed end. The plurality of grooves 22 are contemplated to retain the germicidal coating 20 on the exterior surface 21. In the shown embodiment, the germicidal coating is contemplated to comprise a height greater than a depth of each of the plurality of grooves 22, such that the germicidal coating 20 is contacted by the user when the sanitary cover 11 is gripped. In this manner, the germicidal coating 20 covers an entirety of the sanitary cover 11 to ensure that the user only contacts a sanitized exterior surface 21. In such embodiments, as the sanitary cover 11 is used, the height of the germicidal coating 20 can inform the user as to when the sanitary cover 11 must be replaced. For example, when the germicidal coating 20 no longer extends above the plurality of grooves 22, the efficacy of the germicidal coating 20 is decreased, such that the sanitary cover 11 must be replaced.

Figure 3:
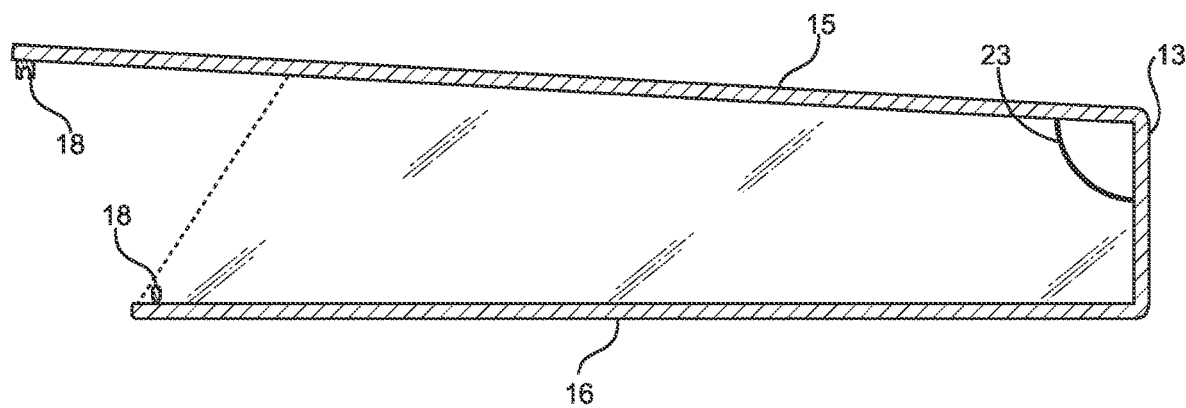
FIG. 3 shows a cross-sectional side view of an embodiment of the sanitary cover.

Referring now to FIG. 3, there is shown a cross-sectional side view of an embodiment of the sanitary cover. In the illustrated embodiment, the sanitary cover having an open end similar to the embodiment of FIG. 1A comprises a lower wall 16 extending orthogonally from the base 13, such that the lower wall 16 provides a flat surface upon which the sanitary cover can rest. The upper wall 15 of the shown embodiment extends from the base 13 at an obtuse angle 23, such that the open end defines a larger cross-sectional area than the base 13. In this manner, the user can easily insert an object into the larger end, particularly for objects having variable sizes across the length of the object. Furthermore, in the shown embodiment, the upper wall 15 comprises a length greater than that of the lower wall 16, such that the upper wall 15 folds downwardly towards the lower wall 16 to close the open end via the closure 18. In this manner, the open end can be closed at an angle relative to the base 13, such that the open end can conform to an angled end of the object, such as the remote control shown in FIG. 4A.

Figure 4A:
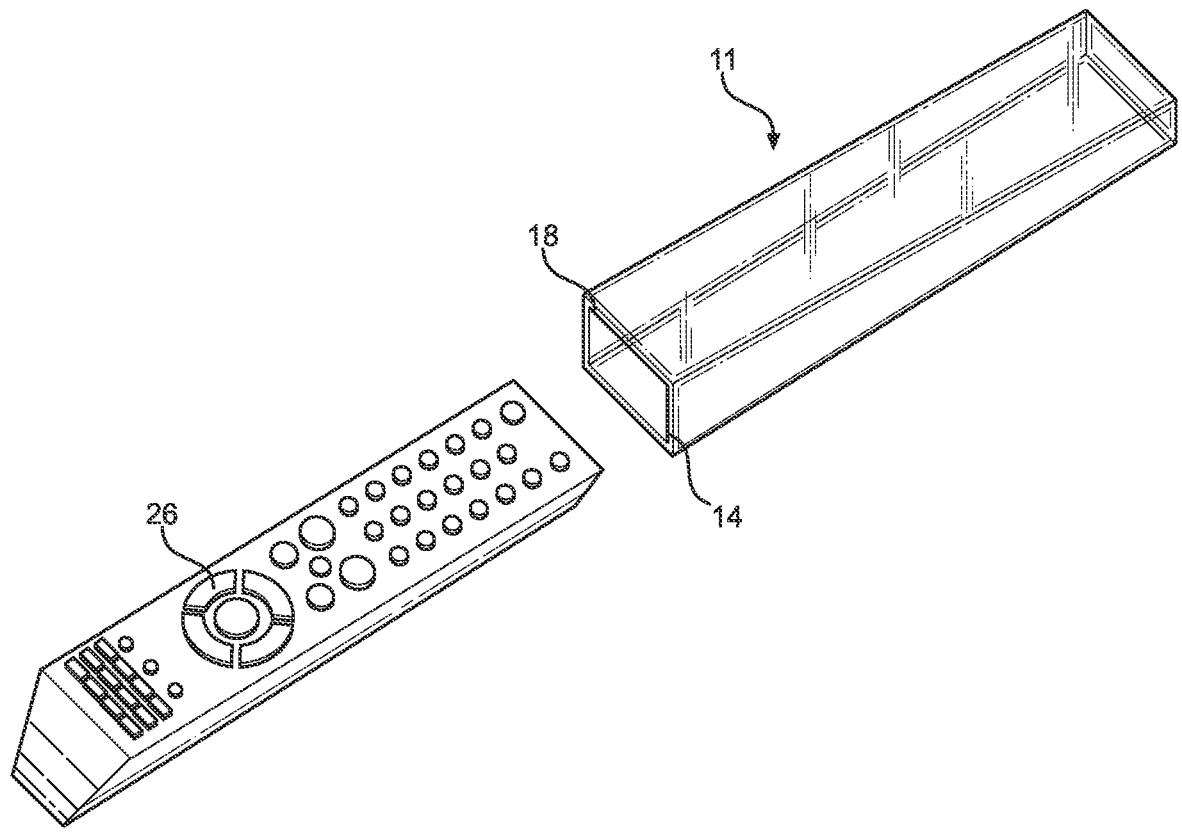
FIG. 4A shows a perspective view of an embodiment of the sanitary cover in use.
Figure 4B:
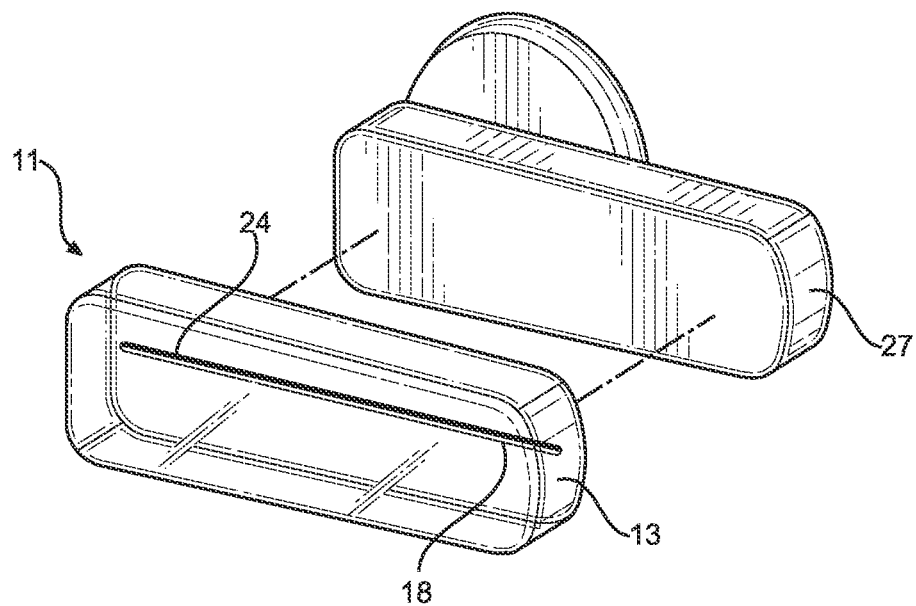
FIG. 4B shows a perspective view of an alternate embodiment of the sanitary cover in use.

Referring now to FIGS. 4A and 4B, there is shown a perspective view of an embodiment of the sanitary cover in use and a perspective view of an alternate embodiment of the sanitary cover in use, respectively. In one use, the user can insert an object, such as a remote control 26 as shown in FIG. 4A into the interior volume of the sanitary cover 11 via the open end 14. Once inside, the open end 14 can be closed via the closure 18 to seal the remote control 26 within the interior volume. The transparent material of the sanitary cover 11 allows the user to operate the remote control 26 easily, while also ensuring that any harmful contaminants, such as germs, bacteria, viruses, or the like are eradicated by the germicidal coating disposed across an entire exterior surface of the sanitary cover 11. Once the germicidal coating is no longer viable, or after a first user is no longer present, such as when new guests check into the previous guest's hotel room, the sanitary cover 11 can be exchanged for a new one in order to ensure maximal sanitation.

Similarly, other frequently contacted objects can be covered with a sanitary cover 11, such as a door or toilet handle 27 as shown in FIG. 4B. In such embodiments, the opening 24 disposed on the lower wall of the sanitary cover 11 can be used to insert the handle 27 into the interior volume of the sanitary cover 11. The closure 18 can then be sealed about the stem or connection point of the handle 27, ensuring that the entirety of the frequently contacted surface of the handle 27 is covered thereby. In the shown embodiment, the base 13 is arcuate to conform with the arcuate distal end of the handle 27 as shown to minimize shifting of the sanitary cover 11 during use. In this manner, the user can minimize contact with various frequently contacted surfaces, while also ensuring that the surface of the sanitary cover 11 is disinfected continuously by the germicidal coating thereon.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sanitary cover, comprising:
a flexible member having a base, an open end opposite the base, an upper wall, a lower wall, and a pair of sidewalls defining an interior volume;
a closure disposed on the upper wall and the lower wall at the open end;
wherein the closure is configured to seal the interior volume when removably secured together;
a germicidal coating on an exterior surface of the flexible member;
wherein the germicidal coating comprises an anti-bacterial gel.

2. The sanitary cover of claim 1, wherein the exterior surface of the flexible member comprises a textured surface.

3. The sanitary cover of claim 2, wherein the textured surface comprises a plurality of grooves extending along the exterior surface.

4. The sanitary cover of claim 1, wherein the closure comprises a zipper closure.

5. The sanitary cover of claim 1, wherein the closure comprises an adhesive closure.

6. The sanitary cover of claim 1, wherein the upper wall comprises a greater length than that of the lower wall.

7. The sanitary cover of claim 1, wherein the lower wall extends orthogonally from the base and the upper wall extends from the base at an obtuse angle such that the open end comprises a greater area than the base.

8. The sanitary cover of claim 1, wherein the base comprises an arcuate shape.

9. A sanitary cover, comprising:
a flexible member having a base, an open end opposite the base, an upper wall, a lower wall, and a pair of sidewalls defining an interior volume;
an opening defined through the lower wall providing access to the interior volume;
a closure disposed along the opening;
wherein the closure is configured to seal the interior volume when removably secured together;
a germicidal coating on an exterior surface of the flexible member;
wherein the germicidal coating comprises an anti-bacterial gel.

10. The sanitary cover of claim 9, wherein the exterior surface of the flexible member comprises a textured surface.

11. The sanitary cover of claim 10, wherein the textured surface comprises a plurality of grooves extending along the exterior surface.

12. The sanitary cover of claim 9, wherein the closure comprises a zipper closure.

13. The sanitary cover of claim 9, wherein the closure comprises an adhesive closure.

14. The sanitary cover of claim 9, wherein the upper wall comprises a greater length than that of the lower wall.

15. The sanitary cover of claim 9, wherein the lower wall extends orthogonally from the base and the upper wall extends from the base at an obtuse angle such that the open end comprises a greater area than the base.

16. The sanitary cover of claim 9, wherein the base comprises an arcuate shape.

17. The sanitary cover of claim 9, wherein the closure extends along an entirety of the lower wall between the base and the closed end.

18. A sanitary cover, comprising:
a flexible member having a base, an open end opposite the base, an upper wall, a lower wall, and a pair of sidewalls defining an interior volume;
wherein the lower wall extends orthogonally from the base and the upper wall extends from the base at an obtuse angle such that the open end comprises a greater area than the base;
a closure disposed on the upper wall and the lower wall at the open end;
wherein the closure is configured to seal the interior volume when removably secured together;
a germicidal coating on an exterior surface of the flexible member.

* * * * *